Figure 3:
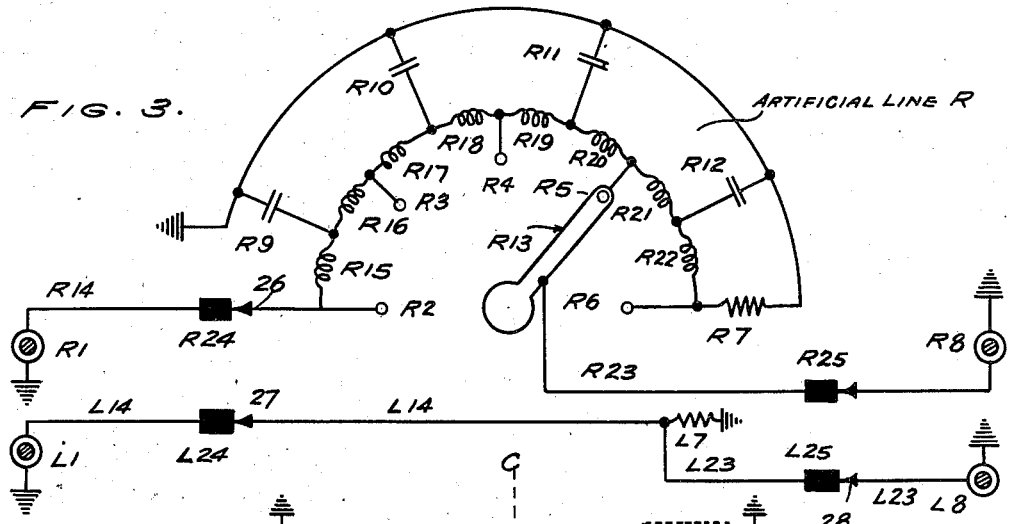

Jan. 29, 1935.  R. B. COLTON ET AL  1,989,082
ELECTRIC TIME COMPENSATOR
Filed Oct. 6, 1930  3 Sheets-Sheet 1
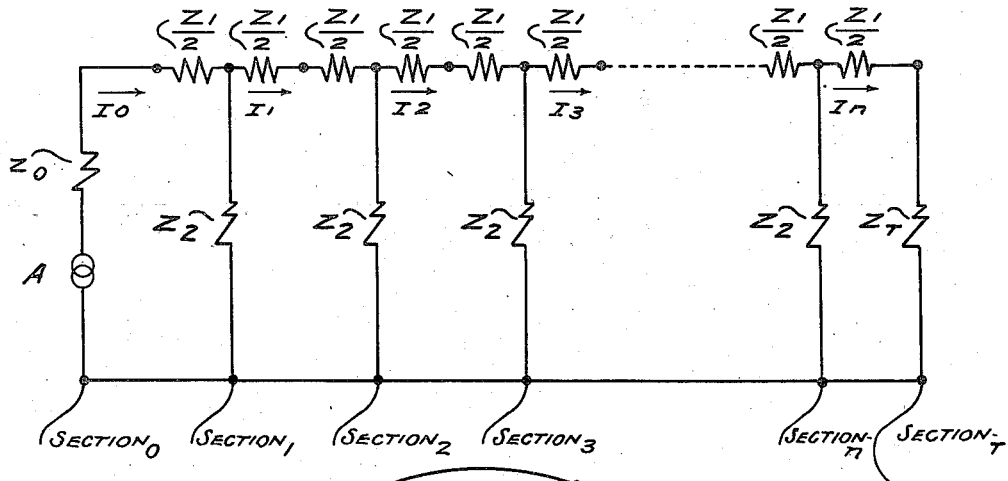
FIG. 1.
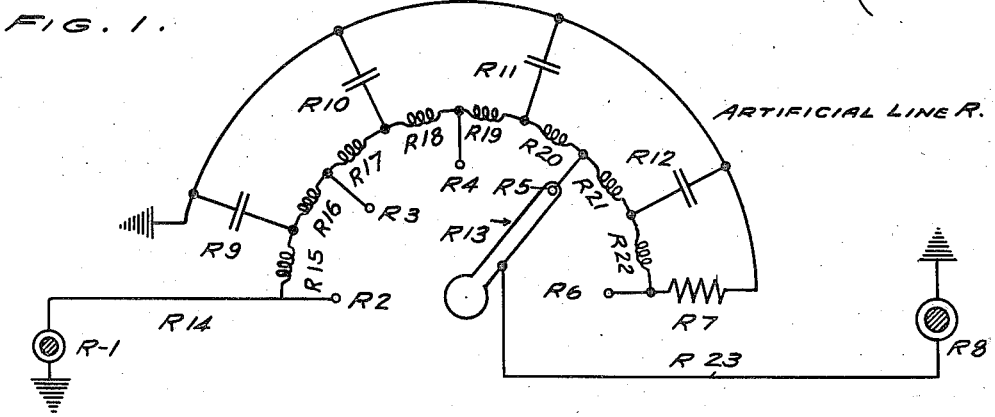
FIG. 2.
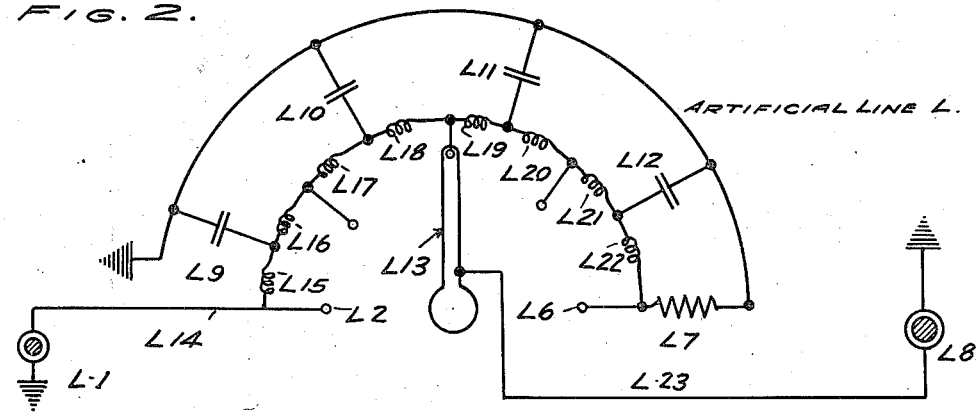
INVENTORS
ROGER B. COLTON
HAROLD C. MABBOTT
BY Robert H. Young
ATTORNEY

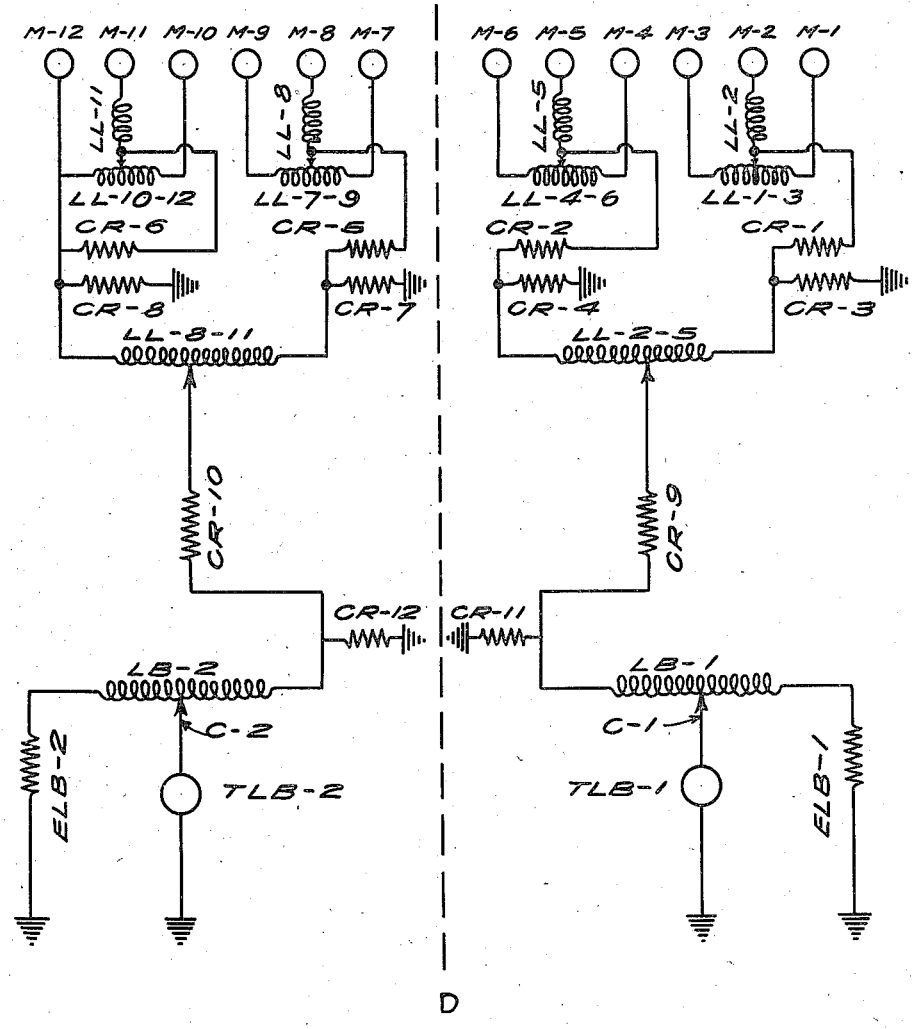

Patented Jan. 29, 1935

1,989,082

UNITED STATES PATENT OFFICE 1,989,082

ELECTRIC TIME COMPENSATOR

Roger B. Colton and Harold C. Mabbott, Fort H. G. Wright, N. Y.

Application October 6, 1930, Serial No. 486,733

1 Claim. (Cl. 177—386)

(Granted under the act of March 3, 1883, as amended April 30, 1928; 370 O. G. 757)

The invention described herein may be manufactured and used by or for the Government for governmental purposes, without the payment to us of any royalty thereon.

Our present invention relates to an electric time compensator.

The object of our invention is to determine a time difference which exists between the electromotive forces of two or more devices when the electromotive forces of the devices differ substantially in time relation only.

Our invention has a major application in determining the direction of propagation of wave energy and particularly sound wave energy. In systems of this sort the direction of propagation of a source of wave energy such as a sound source is determined by measuring the time interval or intervals elapsing between the interception of the wave front produced by such a source at two or more fixed but separated points.

One method of measuring this time difference consists in translating the wave energy at two separate points by means of detectors such as microphones or similar devices, into electrical energy of similar time shape and separately transmitting this electrical energy to the opposite ears of an observer where it is translated into audible effects by telephone receivers, one of the effects being retarded to bring the two into phase to produce an effect on the observer of a sound coming from directly in front of him. The electrical wave in one transmitting path is retarded by lengthening that particular path relative to the other, and this lengthening is accomplished by including between the detectors and the receivers a variable number of sections of an artificial transmission line. In this method, the telephones or phase comparing devices have an impedance equal to the surge impedance of the artificial lines to which they are connected.

In accordance with another method, instead of varying the number of sections of the artificial lines, artificial lines are provided of constant length each line having associated with one end thereof a detector, and with the other end thereof an impedance equal to the surge impedance of the line; and phase comparing devices such as headphones are adapted to be connected at various points along the artificial lines to obtain a comparison of the phase of the waves at such points on the lines during their progress over the lines. In this system each headphone or phase comparing device has an impedance infinitely high compared with the surge impedance of its associated artificial line.

In accordance with one feature of our present invention, artificial lines, each of a constant number of sections, are provided somewhat as in the second method described above, but, instead of tapping each line with a high impedance, each line is suitably tapped with a relatively low impedance in a manner to be described below.

The present invention has the advantage over the first method described above in that a large number of current bearing switches are eliminated and over the second method in that the volume of received energy is greatly increased.

The present invention will more clearly appear from the following specification and annexed drawings, in which Figure 1 is a schematic drawing of an artificial line and Figures 2, 3, 4 and 5 represent different forms of our invention as used in connection with sound direction finding.

Our invention will be most readily rendered clear to those familiar with the art if we first give an abbreviated mathematical treatment of the principles involved. Referring to Figure 1, A is a generator supplying an electromotive force $$E = A e^{i\omega t}$$

(vector). $Z_0$ is the impedance exclusive of the recurrent structure at the input end. $Z_T$ is the terminal impedance or load. Sections 1, 2 and 3 - - - - $n$ are identical in construction. $Z_0$, $Z_1$, $Z_2$ and $Z_T$ will initially all be allowed to have any desired electrical values. $I_0$, $I_1$, $I_2$ - - - $I_n$ are the currents leaving the 0, 1, 2 - - - $n$ sections respectively.

The whole structure from Section I to Section $n$ inclusive constitutes a "T" section artificial line. It can be shown that $$I_m = \frac{E}{Z_0 + Z_\infty} \cdot \frac{K^m + YK^{2n-m}}{1 - XYK^{2n}}$$

where K is defined by the relation $$K + \frac{1}{K} = 2 + \frac{Z_1}{Z_2}$$

and $$X = \frac{Z_\infty - Z_0}{Z_\infty + Z_0}$$

and $$Y = \frac{Z_\infty - Z_T}{Z_\infty + Z_T}$$

and $$Z_\infty = Z_1 \sqrt{\frac{1}{4} + \frac{Z_2}{Z_1}}$$

K is a complex quantity of the nature $$K = P \angle \varphi$$

where P is a scalar and $\varphi$ is an angle.

It is well known to the art that line constants can be adjusted so that $$\varphi = 2\pi f T_s = \omega T_s$$

where $f$ is frequency and $T_s$ is a constant time difference over a wide frequency band and all lines hereafter mentioned will be assumed as so adjusted.

If in the line shown in Figure 1 we make $$Z_0 = Z\infty = Z_T$$

Then $$I_m = \frac{E}{2Z\infty} K^m$$

$$I_m + 1 = \frac{E}{2Z\infty} K^{m+1}$$

whence $$\frac{I_m+1}{I_m} = K = P \angle \varphi$$

or the angular part vector ratio of the current in adjacent sections has a constant value at a given frequency. It is this relationship, together with the relationship $$\varphi = \omega T_s$$

that has been used in former compensating systems. In our present invention, no attempt is made to keep the vector ratio of currents constant from section to section, but instead, the angular part of vector ratio of successive step by step current measurements is kept equal to $\varphi$ and since $$\varphi = \omega T_s$$

a constant time difference between measurable electrical conditions is procured in the manner which will now be explained. For instance, let us suppose an impedance $Z_u$ is connected across the output of the $p$th section, where $p$ is any positive integer, and that we make $$Z_0 = Z\infty = Z_T \ i.\ e.\ X = 0$$

In this case we have $$I'_P = \frac{E}{2Z\infty} K^P (1 + Y_P)$$

where $$Y_P = \frac{Z\infty - \frac{Z_U Z\infty}{Z_U + Z\infty}}{Z\infty + \frac{Z_U Z\infty}{Z_U + Z\infty}}$$

and $$1 + Y_P = \frac{(Z\infty + Z_U)2}{Z\infty + 2Z_U}$$

since the line may, from the point of view of the general formulæ, be considered as being terminated at the output of the $p$th section by the parallel impedances $Z_u$ and $Z\infty$ and with $$Y = Y_P, Z\infty$$

now being the input impedance of the input terminals of the $(p+1)$th section since, by assumption $Z_T = Z\infty$. Likewise, if the impedance $Z_u$ were connected across the output of the $(p+1)$th section instead of the $p$th section, we obtain, $$I''_{P+1} = \frac{E}{2Z\infty} K^{P+1} (1 + Y_P)$$

whence $$\frac{I''_{P+1}}{I'_P} = K = P \angle \varphi$$

Thus it is seen that any value may be allotted the impedance $Z_u$ without disturbing the vector ratio of the output current of any two successive line sections, when successively bridged by a fixed impedance $Z_u$, when $$Z_0 = Z\infty = Z_T$$

whence it also follows that the vector ratio of currents in the fixed impedance $Z_u$ has a like constant ratio. While the above result has been developed here only for the T section line, it holds equally well for a $\pi$ section line. In either case there may be mutual inductance between elements. The artificial lines themselves form no part of our present invention except by combination.

The best value of $Z_u$ will depend upon the accuracy of measurement desired and the accuracy with which the condition $$Z_0 = Z\infty = Z_T$$

is met, and also on the energy available.

The formulæ given above are sufficient for one skilled in the art to determine the best value of $Z_u$ under any given set of conditions.

Under the conditions given, consideration of the general formulæ shows that when $$Z_0 = Z\infty = Z_T =$$

a nonreactive resistance, the power consumed in the impedance $Z_u$, if $Z_u$ is also a nonreactive resistance, is:—

$$E^2 K^{2P} \frac{Z_U}{(Z\infty + 2Z_U)^2}$$

which has its maximum when $$Z_u = \frac{1}{2} Z\infty$$

and is specifically $$\frac{E^2 K^{2p}}{8Z\infty}$$

This is the optimum relation therefore for a system of this kind when the energy received by the phase comparing devices is the important consideration.

One form of our invention is illustrated in Figure 2. Referring to this figure, R1 and L1 are detectors of sound energy. Each detector is connected to an artificial line of the type already discussed. Each of these lines is terminated with its $Z\infty$ (R7 and L7) and is connected through a rotary switch to phase comparing devices R8 or L8.

Specifically, referring to Figure 2, the sound detectors R1 and L1 generate electric currents which flow through the wires R14 and L14 respectively to the input terminals R2 and L2 of the artificial lines R and L. The lines R and L as shown consist of four T sections, each composed of shunt condensers R9 to R12 and L9 to L12 and the series impedances R15 to R22 and L15 to L22.

The lines may be tapped by the rotary switches R13 and L13 at any mid-series junction and the resulting currents lead through wires R23 and L23 to phase comparing devices R8 and L8 respectively, through which they pass and return through ground to detectors R1 and L1. The detectors R1 and L1 should, in general, have an impedance equal or nearly equal to the $Z\infty$ of the artificial lines. The phase comparing devices as has been previously shown may have any desired impedance, the value one-half the surge impedance of the lag line to which connected being preferable when the wave energy is small.

The operation of this form of our invention is as follows: We will assume that a source of sound is so located with respect to detectors R1 and L1 that the detector R1 is affected before the detector L1, and that the sound wave is substantially a plane wave. The response of the detector R1 will generate an electromotive force. We have found by experiment that in sound direction finding systems this electromotive force may be treated as a number of steady harmonic functions of time, i. e., the transient conditions are of minor importance in substantially all sound sources, hence the general equations discussed above apply with great accuracy. Such being the case, the artificial line R will be actuated by a sound of any given frequency as if an electromotive force $$E_r = A_R e^{i\omega T}$$

were impressed on its input through the resistance of the detector and its associated leads. Likewise an electromotive force of the form $$E_L = A_L e^{i(\omega t - \psi)}$$

will appear to be impressed on the input of the artificial line L through the resistance of L1. In this case $\psi$ is the phase angle between sound pressure at R1 and L1. Consequently there will be generated in the phase comparing device R8 a current $$I'_{R_P} = \frac{E_R}{2Z_\infty} K^P{}_R (1+Y_P)$$

and in the phase comparing device L8 a current $$I'_{L_P} = \frac{E_L}{2Z_\infty} K^P{}_L (1+Y_P)$$

$P_R$ and $P_L$ being the number of sections up to R13 and L13 respectively.

From the above equations it is seen that when $$K^P{}_R = K^P{}_L e^{-i\psi}$$

the currents in the phase comparing devices are identical in phase which is the condition sought.

The operation of the device therefore consists in moving either or both of the rotary arms R13 and L13 until the indicators R8 and L8 show a phase balance. The difference in phase between the electromotive forces (and also the sound pressures) at R1 and L1 is then $$(P_R - P_L)\varphi$$

where $\phi$ is the angular part of the vector ratio of the output currents of two successive sections of R or L, when successively bridged by the impedance of the corresponding detector. Further, since in lines of the type to be used as R and L, $$\varphi = \omega T_s$$

where $T_s$ is a constant and a time difference, the time required for the sound wave front to pass from R1 to L1 is given by the equation $$T = (P_R - P_L) T_s$$

Now if the source of sound is at a distance large compared with the distance between detectors R1 and L1, the direction of the sound is determinable from the equation $$\Theta = \sin^{-1} \frac{VT}{L}$$

where $\Theta$ is the angle the sound ray makes with the normal to the center of the line joining detectors R1 and L1, V is the velocity of the sound in the medium, and L is the distance between detectors R1 and L1.

Still another arrangement of our invention is shown in Figure 3. The arrangement is similar to that of Figure 2 except line L has been reduced to zero time length and that jacks R24, L24, L25 and R25 and plugs 26, 27, 28 and 29 have been inserted in the lines R14, L14, L23 and R23. As shown, circuit connections are identical with those of Figure 2. If, however, plugs 26 and 27 are interchanged and at the same time plugs 28 and 29 are interchanged, the line R will be placed in the circuit L1—L8 and the line L (now reduced to zero time length) will be placed in the circuit R1—R8. This arrangement permits measurement of plus and minus time differences with the use of substantially one line (since one line is reduced to zero time length).

In one arrangement of our invention, the rotary switches R13 and L13 in Figure 2 may be mounted on the same shaft and so connected to their respective artificial lines that as compensation is taken out of one side it is either immediately or one half step later placed in the other.

In still another arrangement the rotary switches such as R—13 alternately make contact with one junction point such as R—4 and then with two adjacent junction points such as R—4 and R—5, then R—5 alone, R—5 and R—6 etc. This may be accomplished by properly proportioning the switch leaf with respect to the contact stud.

In another arrangement the rotary switches may be replaced by relays and a single rotary control switch.

Figure 4:
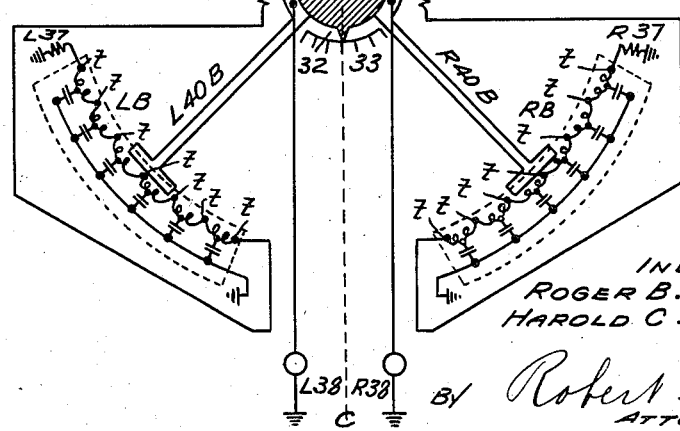

Another form of our invention is illustrated in Figure 4. In this case our invention is arranged for its application to a system of six microphones equally spaced in a straight line. Microphones R34, R35 and R36 of impedance $Zm$ are connected to the right input terminal of lag line RM1, the input terminal of lag line RM2 and the left input terminal of RM1 respectively. The lag lines RM1 and RM2 each have the surge impedance $Zm$, whence the X reflection coefficients of these lines are zero. The lag line RM2 has one half the time length of RM1.

The lag line RM2 is connected to the rotary brush R40 M. The brush R40 M is connected through the resistance R31 to the input terminal of lag line RB and through the resistor R30 to ground. The output terminal of the lag line RB is connected through the resistor R37 to ground. The lag line RB has a surge impedance $Z_B$. The value of the resistor R37 is made equal to $Z_B$. The impedance looking back from lag line RB toward resistance R31 is $$\frac{1}{\frac{3}{Zm} + \frac{1}{R30}} + R31$$

which we make equal to $Z_B$ thereby making the X reflection coefficient of lag line RB=0. The lag line RB is tapped adjustably at any section junction "$t$" by the rotary brush R40 B which is in turn connected to one element of a phase comparing device R38 which may have any desired impedance but for maximum energy transfer should have the value $$\frac{Z_B}{2}$$

The description just given applies equally well to the apparatus to the left of the line $cc$ if we substitute the letter L for letter R wherever the latter letter occurs.

The rotary brushes R40 M and R40 B are fixed in relation to each other by being fastened to the insulating block 39 which is carried by shaft 41. These brushes are so spaced that when brush R40 M is in contact with the mid-section junction of RM 1, the brushes R40 B, L40 M and L40 B will be in contact with the mid-section junctions of lag lines RB, LM 1 and LB respectively. The displacement of any of the above brushes by a given number of junctions on its associated lag line causes a similar displacement of all other brushes with respect to their associated lag lines in the same direction of rotation. The insulating block 39 carries a pointer 32 operating over a scale 33 which is graduated to indicate the position of the rotary brushes step by step.

If the rotor 39 is rotated counter-clockwise one step, the following conditions will hold:

The current from sound source R34 will be lagged 4 $T_m$  
" " " " " R35 " " 3 $T_m$ ⎫ Upon arrival  
" " " " " R36 " " 2 $T_m$ ⎬ at brushes  
" " " " " L34 " " 4 $T_m$ ⎨ R40 M and  
" " " " " L35 " " 3 $T_m$ ⎩ L40 M,  
" " " " " L36 " " 2 $T_m$ where $T_m$ is the time lag of one section of RM 1 since we have made the input reflection coefficients of all lag lines zero, as required by our general theory. The currents from R34, R35 and R36 are therefore in phase at brush R40 if the sound pressures on R34, R35 and R36 differ successively by 1 $T_m$ in time phase, the phase of the pressure of the hydrophones on the right leading the phase of the pressure on the hydrophones to the left. Like remarks apply to the currents from L34, L35 and L36. In this case the current delivered by brush L40 B to lag line LB must necessarily lag that delivered by brush R40 B to lag line RB by 3 $T_m$. However, since the rotor R33 has been rotated one step counter-clockwise, the current from brush R40 B will be lagged 4 $T_B$ before delivery to telephone R38 and that from brush L40 B will be lagged 2 $T_B$ before delivery to telephone L38, hence in the arrangement illustrated in Figure 4 we make $$3 T_m = 2 T_B$$

Such being the case we find that a difference in time phase between adjacent microphones:

Of 1 $T_m$ calls for one step rotation of rotor 39
2 $T_m$ calls for two steps rotation of rotor 39
3 $T_m$ calls for three steps rotation of rotor 39 in order to produce identical sound conditions at telephones R38 and L38. Conversely, establishment of identical sound conditions at R38 and L38 determines a time difference in sound conditions between microphones proportional to the rotation of rotor 39, and the scale 33 may be so graduated that the direction of sound may be read therefrom opposite pointer 32.

In Figure 5 is illustrated schematically the application of our invention to a system of twelve microphones arranged in two groups of six each. The microphones M1 to M6 are connected in numerical order to lag lines LL 1—3, LL 2, LL 1—3, LL 4—6, LL 5 and LL 4—6 as shown. The lag line LL 2 which has one half the time length of LL 1—3 is connected to the movable contact arm of a rotary switch (not shown) making contact with a plurality of segments (not shown) each of which is connected to a section junction of the line LL 1—3. Similar remarks apply to lag lines LL 5 and LL 4—6. From LL 2 and LL 5 we feed through the networks CR 1 and CR 3, CR 2, and CR 4 into opposite ends of lag line LL 2—5, the section junctions of which are connected to the fixed segments of a rotary switch. The section junctions of the lag line LB 1 are likewise connected to the fixed segments of a rotary switch. The movable arm of the LL 2—5 switch is connected electrically through the network CR 9 and CR 11 to the input of lag line LB 1, which is terminated by its surge impedance ELB 1. The movable arm of the LB 1 switch is connected to one element of a phase comparing device TLB 1 which may have any desired impedance. Similar remarks apply to the lines to the left of the line D—D. All rotary switch arms are driven in synchronism by virtue of being on the same shaft or through suitable gearing. The time lag relationship is to be satisfied by the gearing ratios is that one unit of time movement on LB 1 shall cause $$\frac{d2-5}{d1-7}$$

unit of time movement on LL 2—5, $$\frac{d1-3}{d1-7}$$

unit of time movement on LL 1—3 and LL 4—6, $d$ being read in each case "distance between microphones numbered". Similar remarks apply to the left of the line DD.

In this form of our invention we always make the X reflection coefficient of each lag line zero. The net works CR 1 and CR 3, CR 2 and CR 4, CR 9 and CR 11 and the similar networks to the left of the line DD are used to adjust reflection coefficients in the manner described in connection with Figure 4.

Where we have used the term microphone we intend equally any form of electro-acoustic device including associated electrical elements arranged to translate acoustic energy into electrical energy of similar time shape.

To facilitate identification of detailed elements of the system, it is advisable to classify the lag lines of a compensator as "tributary" and "receptor" lines. Thus, in Fig. 5, lines LL—1—3 and LL—5 are tributary lines associated with the receptor line LL—2—5. Likewise when LL—2—5 is considered in conjunction with LB—1, LL—2—5 consists of two tributary lines associated with the receptor line LB—1.

Although in connection with Figures 2 to 5 inclusive we have specified or assumed rotary switches we do not intend that our invention shall be limited to this type of switch it being operative with any type of relay or switch system which accomplishes the same series of connections outlined in our descriptive matter above. While in the previous discussion "T" section lines have been shown they might equally well be $\pi$ section lines, and in either case with or without mutual inductance. While we have shown in each case a small number of line sections a larger number is equally intended where greater fineness of reading is desired.

While we have described our invention with relation to its use in determination of the direction of sound wave energy it is equally applicable to the determination of direction of other forms of wave energy or for the comparison of electric time differences.

Although in the above description we have shown resistance networks inserted between tributary lines or between tributary lines and the final phase comparing lines, these networks may be omitted when the values of the series resistance become zero and the shunt resistances become infinite when calculated by the formulæ we have given, or transformers may be used in the place of said resistance networks. When transformers are used, the impedance transformation ratio of each transformer should be $$\frac{N_0 Z_i}{N_i Z_0}$$

where $N_i$ and $N_0$ are number of incoming and outgoing lines respectively and $Z_i$ and $Z_0$ are the surge impedances of the incoming and outgoing lines respectively.

Reference is made to our copending application, Serial No. 486,734, filed October 6, 1930, in which the system disclosed is closely related in principle and operation to the subject matter of the present case. It will be noted, however, that in the present case the invention makes it possible for lag lines of constant length to be tapped at interior junction points, and instead of a high impedance, each line is suitably tapped with a relatively low impedance. These and other distinctive features form a part of the invention as herein claimed, and will more fully appear from a comparison of the complete disclosures of the respective cases.

Our invention is not limited to use in connection with the exact number of microphones or input devices that we have shown in the various figures, any number may be used in accordance with the principles we have enunciated.

We claim:

In an electrical compensator, comprising a series of tributary and receptor lag lines, and a final receptor lag line tapped at an interior junction point; resistance pads interposed between tributary lag lines and receptor lag lines, each pad including one or more sections composed of series and shunt resistances of relatively low value, and forming with its associated tributary lag line a net-work having, when viewed from its succeeding receptor lag line, the reciprocal of its surge impedance equal to the reciprocal of the surge impedance of its associated receptor lag line.

ROGER B. COLTON.
HAROLD C. MABBOTT.